(12) United States Patent
Dillon

(10) Patent No.: US 9,497,898 B2
(45) Date of Patent: Nov. 22, 2016

(54) AGRICULTURAL HARVESTER UNLOADING ASSIST SYSTEM AND METHOD

(71) Applicant: Tribine Industries LLC, Logansport, IN (US)

(72) Inventor: Ben N. Dillon, Logansport, IN (US)

(73) Assignee: Tribine Industries, LLC, Logansport, IN (US)

( * ) Notice: Subject to any disclaimer, the term of this patent is extended or adjusted under 35 U.S.C. 154(b) by 0 days.

(21) Appl. No.: 14/650,886

(22) PCT Filed: Jan. 23, 2014

(86) PCT No.: PCT/US2014/012737
§ 371 (c)(1),
(2) Date: Jun. 10, 2015

(87) PCT Pub. No.: WO2014/116819
PCT Pub. Date: Jul. 31, 2014

(65) Prior Publication Data
US 2015/0327425 A1    Nov. 19, 2015

Related U.S. Application Data

(60) Provisional application No. 61/756,338, filed on Jan. 24, 2014.

(51) Int. Cl.
| | | |
|---|---|---|
| *A01D 41/02* | (2006.01) | |
| *A01B 69/00* | (2006.01) | |
| *A01D 90/10* | (2006.01) | |
| *A01D 90/12* | (2006.01) | |
| *B65G 67/24* | (2006.01) | |
| *A01D 41/12* | (2006.01) | |

(52) U.S. Cl.
CPC ........... *A01B 69/003* (2013.01); *A01B 69/001* (2013.01); *A01D 41/1208* (2013.01); *A01D 41/1217* (2013.01); *A01D 90/10* (2013.01); *A01D 90/12* (2013.01); *B65G 67/24* (2013.01)

(58) Field of Classification Search
USPC ............. 340/435, 436; 180/235; 701/49, 41, 701/300, 301, 302
See application file for complete search history.

(56) References Cited

U.S. PATENT DOCUMENTS

| | | | | |
|---|---|---|---|---|
| 4,328,422 A * | 5/1982 | Loomer | ................. | B65G 1/065 250/202 |
| 4,331,417 A * | 5/1982 | Shearer, Jr. | .......... | B65G 1/0421 250/223 R |
| 6,097,425 A * | 8/2000 | Behnke | ................. | A01D 43/073 348/120 |
| 6,682,416 B2 * | 1/2004 | Behnke | ................ | A01B 69/008 141/231 |

(Continued)

*Primary Examiner* — Thomas Tarcza
*Assistant Examiner* — Richard Goldman
(74) *Attorney, Agent, or Firm* — Mueller Law, LLC; Jerry K. Mueller, Jr.

(57) ABSTRACT

Disclosed is an improved articulated combine of a forward grainhead carried by a forward bogey devoid of grain storage and operated by an operator and a rear grain storage bogey capable of crabbing. Proximity sensors are affixed to the side of the grainhead and on the side of the rear end of the rear bogey. Cameras are affixed to the front of the forward bogey looking to the side of the forward bogey, to the front of the rear bogey looking rearwardly into the rear bogey grain storage, to the rear of the rear bogey, and on the grain arm discharge end. Readout from the sensors are fed to memory for each type of grain off-loading vehicle for later use by the operator in placing the combine in the optimum unloading position. Video also is fed to a display confronting the combine operator.

7 Claims, 5 Drawing Sheets

(56) References Cited

U.S. PATENT DOCUMENTS

| | | | | |
|---|---|---|---|---|
| 7,143,863 B2* | 12/2006 | Dillon | A01D 41/02 | 180/418 |
| 7,198,449 B2* | 4/2007 | Dillon | A01D 41/1217 | 414/502 |
| 7,277,784 B2* | 10/2007 | Weiss | A01B 69/008 | 172/2 |
| 8,126,620 B2* | 2/2012 | Ringwald | A01B 69/008 | 141/192 |
| 8,230,667 B2* | 7/2012 | Finkler | A01D 41/127 | 56/10.2 A |
| 8,909,389 B2* | 12/2014 | Meyer | A01B 69/008 | 460/1 |
| 9,313,951 B2* | 4/2016 | Herman | A01D 43/073 | |
| 9,332,692 B2* | 5/2016 | Krause | A01D 57/00 | |
| 2002/0044858 A1* | 4/2002 | Barry | B61D 47/00 | 414/392 |
| 2007/0271002 A1* | 11/2007 | Hoskinson | G06Q 10/06 | 700/245 |
| 2009/0044505 A1* | 2/2009 | Huster | A01D 43/087 | 56/10.2 R |
| 2009/0151313 A1* | 6/2009 | Dillon | A01D 41/1208 | 56/14.6 |
| 2010/0063692 A1* | 3/2010 | Madsen | A01D 43/073 | 701/50 |
| 2010/0066517 A1* | 3/2010 | Posselius | G01S 5/0247 | 340/435 |
| 2010/0108188 A1* | 5/2010 | Correns | A01D 43/087 | 141/83 |
| 2010/0266377 A1* | 10/2010 | Yoder | A01D 41/1217 | 414/519 |
| 2011/0061762 A1* | 3/2011 | Madsen | A01D 43/087 | 141/1 |
| 2011/0205084 A1* | 8/2011 | Morselli | A01D 43/086 | 340/901 |
| 2012/0087771 A1* | 4/2012 | Wenzel | A01F 12/60 | 414/808 |
| 2012/0215394 A1* | 8/2012 | Wang | A01D 41/1278 | 701/24 |
| 2012/0302299 A1* | 11/2012 | Behnke | A01B 69/008 | 460/6 |
| 2015/0327425 A1* | 11/2015 | Dillon | A01D 90/10 | 701/41 |

* cited by examiner

AGRICULTURAL HARVESTER UNLOADING ASSIST SYSTEM AND METHOD

CROSS-REFERENCE TO RELATED APPLICATIONS

This application claims benefit of U.S. Provisional Application Ser. No. 61/756,334 filed Jan. 24, 2013.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OF A JOINT INVENTOR

Not applicable.

BACKGROUND OF THE INVENTION

Field of the Invention

The present disclosure relates to a system and method to unload grain from a grain tank on an agricultural harvester to a transport vehicle, and specifically to a system and method that identifies the relative position of a agricultural harvester with regard to the transport vehicle and assists the agricultural harvester operator in maintaining a desired distance between the vehicles.

Description of Related Art Including Information Disclosed Under 37 C.F.R. §§1.97 and 1.98

The subject of an articulated harvester, some of which are based on current commercial grain harvester designs, is disclosed in U.S. Pat. Nos. 4,317,326, 4,428,182, 6,012,272, 6,125,618, 6,339,917, 6,604,351, 6,606,844, 6,604,995, 6,604,350, 6,484,485, 6,612,101, 6,233,911, 6,240,711, 6,167,982, 7,553,228, 8,286,984, and 8,292,008. A harvester/grain cart combination can be converted to an "articulated" combine as disclosed in U.S. Pat. No. 6,910,845. Various grain handling and grain unloading techniques are disclosed, inter alia, in U.S. Pat. Nos. 7,143,863 and 7,198,449. The disclosures of these patents are expressly incorporated herein by reference.

Most of the articulated combines cited above exhibit compromised design features due to the design basis being limited to current commercial grain harvester designs. For example, current commercial grain harvester designs have an onboard grain bin with the forward bogey along with grain heads, cleaners, etc. That does not make such designs faulty, as they represent a substantial advancement in the harvester art for manufactures that want to maintain current grain harvester architecture.

A departure from the art is disclosed in U.S. Pat. No. 6,012,272, however, in that the forward bogey is devoid of an on-board grain bin, but carries the operators cab, engine, grain harvesting assembly, and grain transfer assembly. The rear bogey has the on-board grain bin and steerable powered wheel assembly. U.S. Pat. No. 6,339,917 discloses a similar articulated combine where the forward bogey is devoid of an on-board grain bin, but carries the operators cab, engine, grain harvesting assembly, and grain transfer assembly. The rear bogey has the on-board grain bin and a powered wheel assembly. Tracks, one wheel pair, and two wheel pairs, are illustrated for the harvester.

The presently disclosed articulated combine is based on a different steering philosophy for the rear bogey for grain unloading, as well as for crabbing the rear bogey during grain unloading; and other different philosophies, as disclosed herein.

BRIEF SUMMARY OF THE INVENTION

Disclosed is an improved articulated combine of a forward grainhead carried by a forward bogey devoid of grain storage and operated by an operator and a rear grain storage bogey capable of crabbing. Proximity sensors are affixed to the side of the grainhead and on the side of the rear end of the rear bogey. Cameras are affixed to the front of the forward bogey looking to the side of the forward bogey, to the front of the rear bogey looking rearwardly into the rear bogey grain storage, to the rear of the rear bogey, and on the grain arm discharge end. Readout from the sensors are fed to memory for each type of grain off-loading vehicle for later use by the operator in placing the combine in the optimum unloading position. Video also is fed to a display confronting or facing the combine operator.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which.

Figure 1:
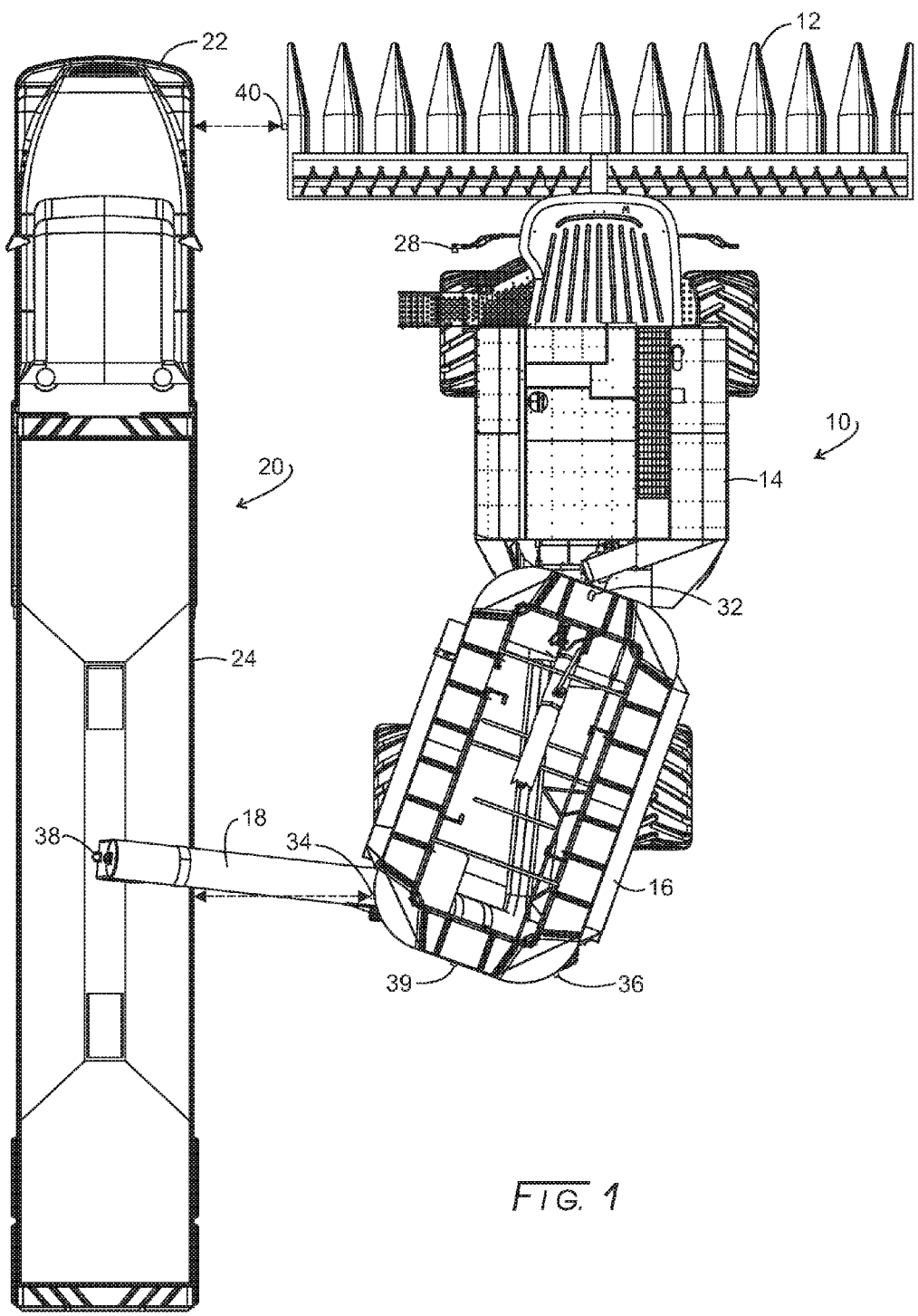
FIG. 1 is an overhead view of the disclosed harvester and a grain hauling semi vehicle with the rear harvester bogey crabbed for unloading grain into the grain hauling semi vehicle and showing the proximity sensors and cameras carried by the disclosed harvester.
Figure 2:
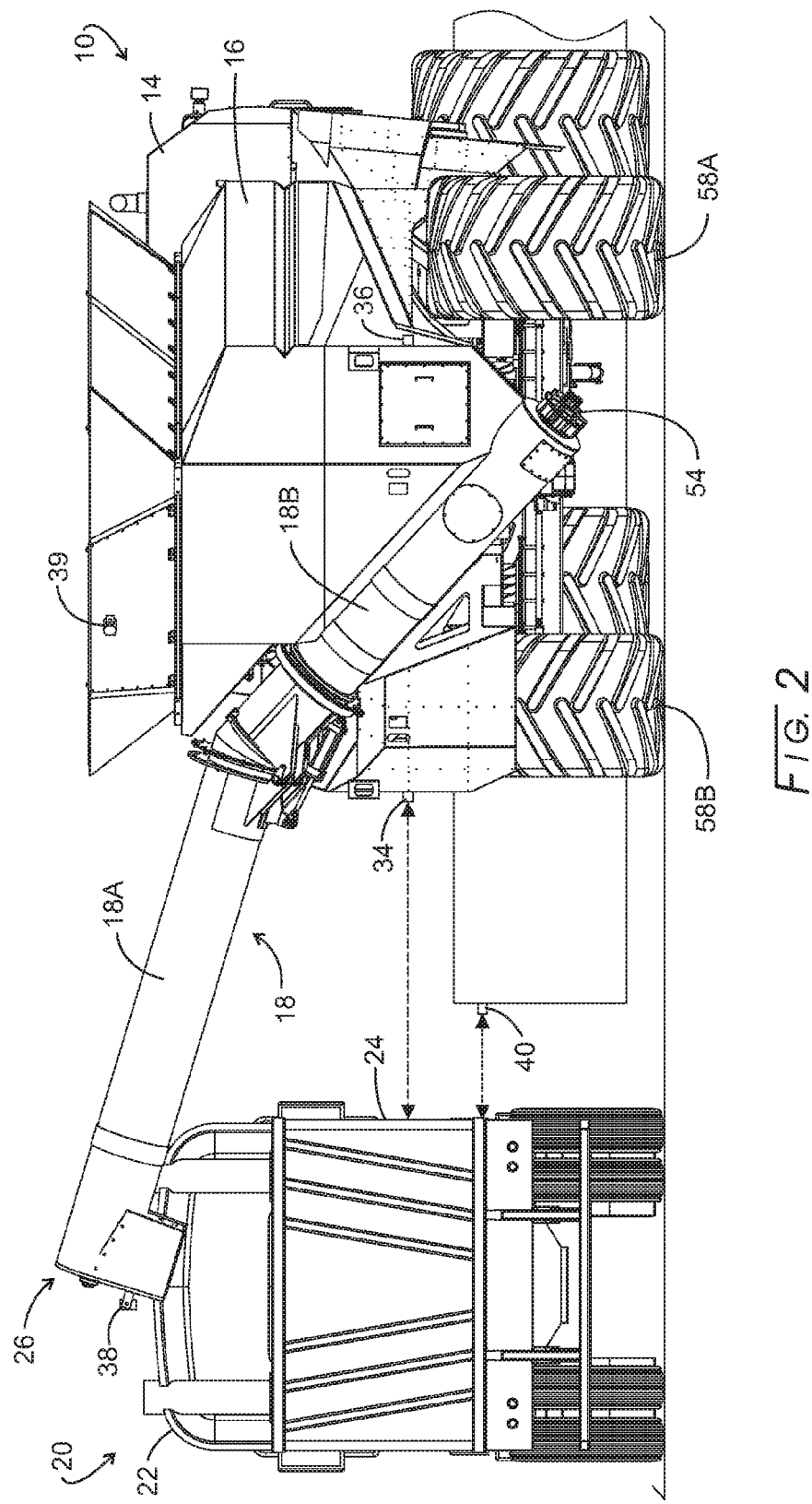
FIG. 2 is a rear view of the disclosed harvester and a grain hauling semi vehicle of FIG. 1.
Figure 3:
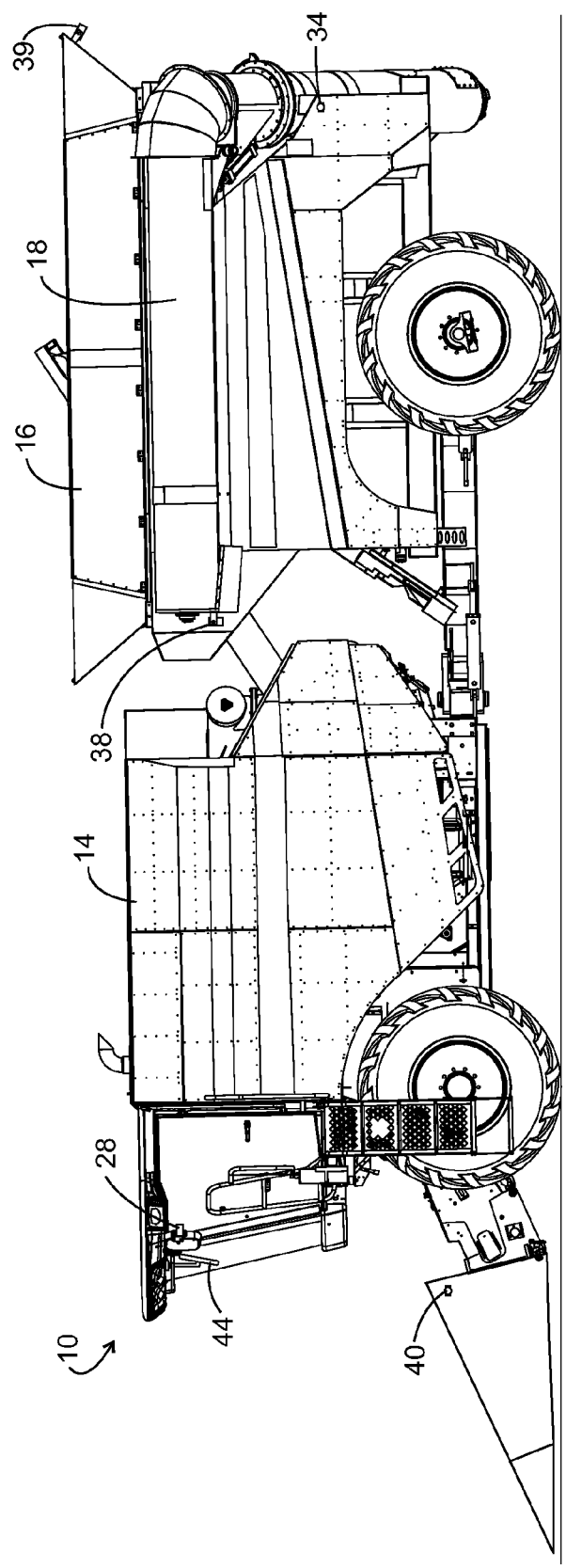
FIG. 3 is a side view of the disclosed harvester of FIG. 1.

The drawings will be described in greater detail below.

DETAILED DESCRIPTION

The articulated agricultural harvester or combine (these terms being synonymous and used interchangeably) in the drawings is a Tribine™harvester (Tribine Industries LLC, Logansport, IN) having a grain bin capacity of 1,000 bushels of clean grain. Such articulated harvester or combine is capable of unloading the clean grain at a rate of 500 bushels per minute. In order for the harvesting combine operator to be able to be at an optimum position relative to the grain hauling vehicle into which clean grain is off-loaded, the combine carries proximity sensors and cameras at various locations identified below along with a readout positioned for viewing by the combine operator to monitor the readout values thereof. Additionally, a processor is used that is capable of learning/storing where the optimum unloading position of the harvester and of the rear grain bogey relative to the grain hauling vehicle for use later. The operator indicates to the processor the optimum values of distance; thus, enabling the processor to store such values for later use on this and other vehicles.

Referring now to FIG. 1, an articulated harvester, combine, or harvesting combine, 10, is fitted with a 16-row cornhead, 12, and consists of a forward bogey, 14, and rear bogey, 16. While combine 10 is fitted with wheels, it could be a tracked combine. Forward bogey 14 is fitted with an operator cab, engine, grain cleaning and handling, and similar capability, but for grain storage, which it is devoid of. Instead, rear bogey 16 is fitted with a grain bin and unloading capability, for example, a grain-unloading arm, 18, housing a conveyor (e.g., a screw conveyor), such as is described in commonly-owned U.S. Pat. No. 8,286,984.

Adjacent to combine 10 is a grain hauling semi vehicle, 20, consisting of a forward cab with engine, 22, towing a grain trailer, 24, capable of holding 1,000 bushels of clean grain. As is typical for modern day combines, combine 10 unloads its clean grain from rear bogey 16 while the combine is in the field harvesting additional grain; thus, the need to unload its grain bin very rapidly. In order to accomplish this grain unloading, transport vehicle 20 pulls up next to combine 10 and or combine 10 moves over adjacent to transport vehicle 20. Rear bogey 16 then can be crabbed to move its unloading arm 18 to a position such that the discharge end, 26, is centered over grain trailer 24 and clean grain unloading proceeds. Since the combine operator needs to steer combine 10 while simultaneously pulling over close to semi vehicle 20 and crabbing rear bogey 16, anything to aid the combine operator in knowing precisely where forward bogey 14 and rear bogey 16 are relative to grain hauling vehicle 20 would be greatly appreciated by the combine operator. It will be appreciated that clean grain also could be unloaded into a grain cart, gravity wagon, or any other storage vehicle.

In order to give this additional position information to the combine operator in real time, forward bogey 14 is fitting with camera, 28, on its left side. Rear bogey 14 also is fitted with camera, 32, at its upper front center. Each of these cameras feeds a video image to the combine operator so he can see grain hauling semi vehicle disclosed harvester and a grain hauling semi vehicle 20.

Rear bogey 16 also is fitted with a proximity sensor, 34, at its left rear and, 36, at its right rear. Discharge end 26 of grain unloading arm 18 also is fitted with a camera, 38. An additional camera, 39, is carried by rear bogey 16 at its upper rear. Finally cornhead 12 is fitted with a proximity sensor, 40 at its left side. All proximity sensors also feed their data to the combine operator. For example, the cameras may be Agcam cameras (Dakota Micro, Inc., Cayuga, N. Dak.) and the sensors may be Senix TSPC-155 ultrasonic distance sensors (Senix Corporation, Hinesburg, Vt.). Harvesting combine 10 unloads clean grain only on its left side in the embodiment in the drawings. It will be recognized that the cameras and sensors could be located only on the right side for unloading clean grain on the right side or located on both sides for providing unloading of clean grain on both sides.

Figure 4:
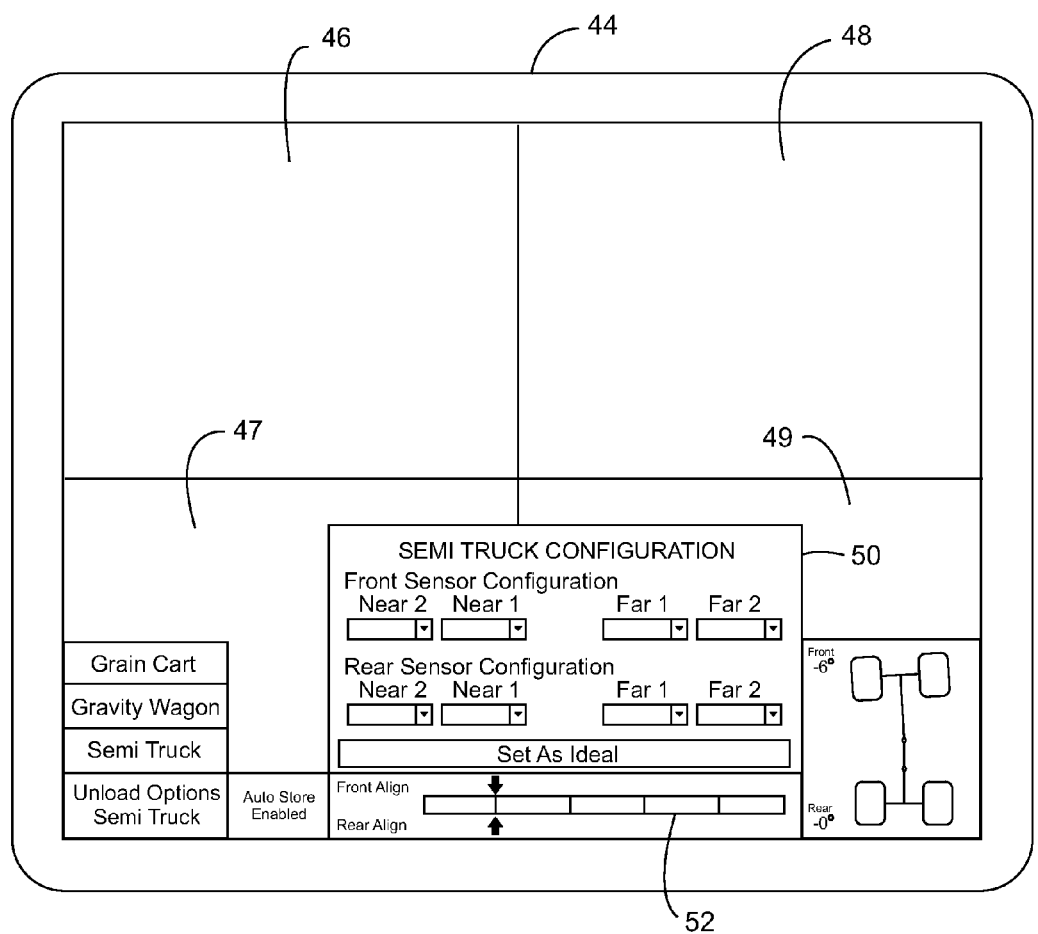
FIG. 4 is the read-out module for the driver of the disclosed harvester showing the relative distance between the disclosed harvester and the grain hauling semi vehicle at different locations and the video feed from the cameras carried by the disclosed harvester.

All readout information from the sensors is fed to a processor (for example, Agcam quad processor DMAC-Q; not shown) and then to an operator interface touchscreen, 44, mounted with a jointed mounting arm and speaker, say, to the upper left front of the combine operator (see FIG. 4). A Topcon AGA4353 touchscreen (Topcon Positioning Systems, Inc., Livermore, Calif.) may be used. Four video screens, 46, 47, 48, and 49, are located in the touchscreen instrument. Sensor distance information, 50 is displayed in the lower half. The combine operator can set the ideal distances for each distance sensor using a light slide bar, 52, which feeds such information to the processor so that it can "learn" such ideal distances for use by the combine operator in later grain unloading operations using, for example, SenixVIEW software. The combine can hear audio commands operator through the provided speaker. Parameters can be set for multiple types of grain off-load vehicles and later recalled for use by the operator.

Figure 5:
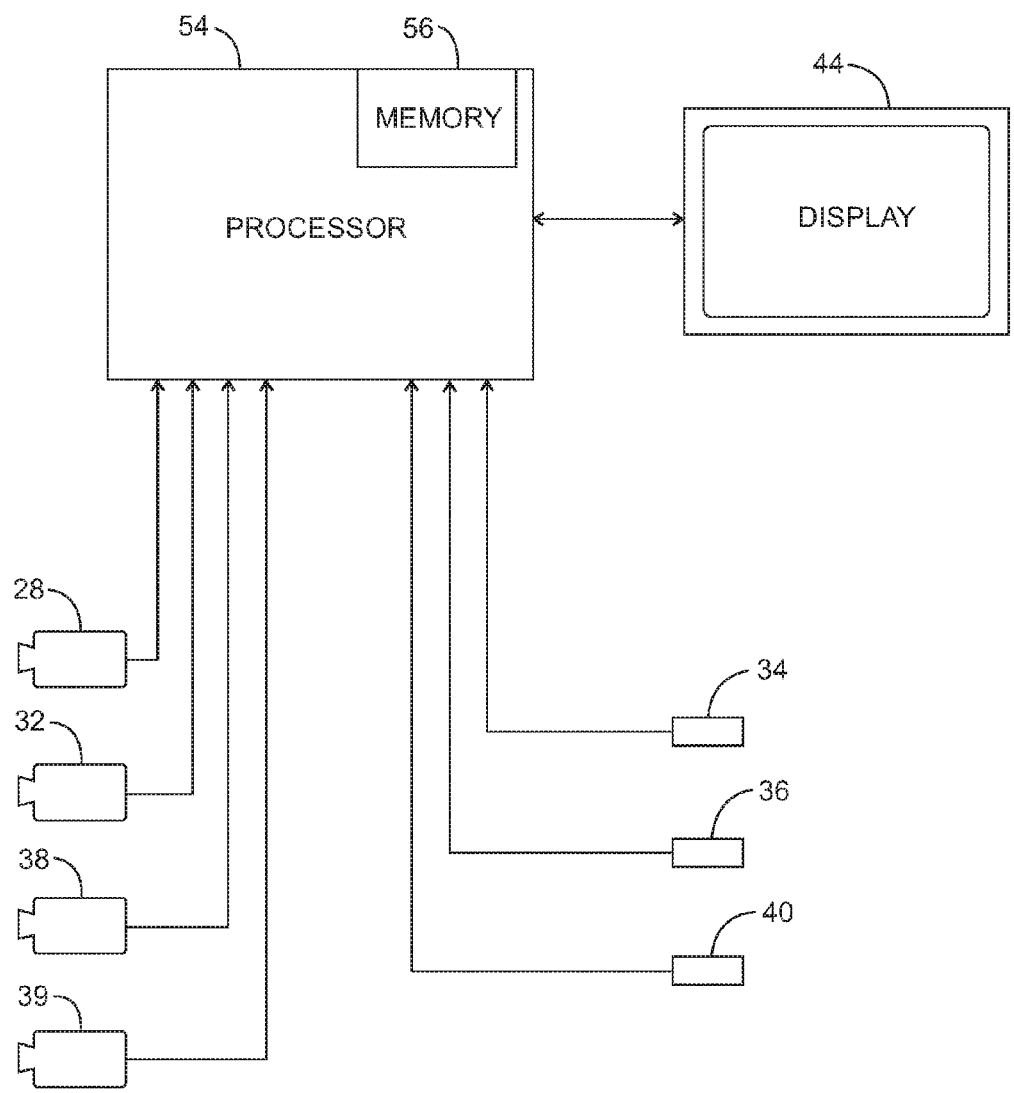
FIG. 5 schematically shows the process with memory that receives signals from the sensors and images from the cameras and sends processed signals therefrom to the display.

FIG. 5 shows signals from cameras 28, 32, 38, and 39 being fed to a processor, 54, that has a memory, 56. Signals from sensors 34, 36, and 40 also are fed to processor 54 for storage in memory 56. Distance information is fed to display 44, as described above. Images from processor 56 also are fed to display 44.

In use, as combine 10 approaches vehicle 20, distance measuring sensor 40 mounted on the left side of harvesting head 12 senses vehicle 20 and starts to measure the standoff distance. Touchscreen 44 will display the distance on red, yellow, and green light bar 52 and audibly inform the operator which direction to steer. The processor will be comparing the measured standoff distance with the optimum distance which the operator has previously set by positioning combine 10 where the operator wants it to unload and hitting the "Learn" button on touchscreen 44, which puts the ideal distance parameters in processor memory by type of off-load vehicle. As the combine moves alongside vehicle 20, sensor 34 mounted near the unload auger measures the standoff distance and tells the operator both visually and audibly whether to crab steer rear module 16 left or right to move unload auger 18 to the optimum standoff distance. This distance also has been previously entered into the system using the learn mode inherent in the Senix Sensors. As combine 10 moves along transport vehicle 20 filling it with grain, the system will continue to alert the operator to any steering corrections needed to maintain the optimum standoff distance for filling the vehicle without spilling grain.

It will be appreciated that once the operator has driven combine 10 next to grain vehicle 20, say, for example, by the grainhead sensor reading the ideal value, the processor can automatically complete moving (steer) the combine into the ideal grain unloading position, including crabbing the rear grain bogey.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. Also, all citations referred herein are expressly incorporated herein by reference.

I claim:

1. An improved articulated combine of a forward grainhead carried by a forward bogey devoid of grain storage, having an unload side and operated by an operator, and a rear grain storage bogey having an unload side and capable of crabbing, the improvement comprising:
   (a) proximity sensors affixed to the sides of the grainhead and on the unload side of the rear bogey;
   (b) memory for storing distance values from the proximity sensors for each type of grain off-load vehicle for later use;
   (c) cameras affixed to the front of the forward bogey looking to the unload side of the forward bogey, to the front of the rear grain storage bogey looking rearwardly into the rear grain storage bogey, and to the rear of the rear grain storage bogey;
   (d) readout from said sensors being fed to a first video screen facing the combine operator; and
   (e) video from said cameras being fed to a second video screen facing the combine operator;
   the combine being steerable adjacent to a grain off-loading vehicle for the combine to unload grain stored in the rear grain bogey into the grain off-loading vehicle.

2. The improved articulated combine of claim 1, wherein a grain unloading arm is located at the rear of the rear grain bogey for unloading grain, said grain unloading arm having a distal grain discharge end.

3. The improved articulated combine of claim 2, wherein a camera is disposed at the grain unloading arm distal grain discharge end.

4. The improved articulated combine of claim 1, wherein the proximity sensors also are connected to a processor for recalling stored distance values from memory for different types of grain off-loading vehicles.

5. The improved articulated combine of claim 4, wherein the combine can be automatically crabbed into position for grain unloading.

6. An improved articulated combine of a forward grainhead carried by a forward bogey devoid of grain storage and operated by an operator and a rear grain storage bogey capable of crabbing, the improvement comprising:
   (a) proximity sensors affixed to the unload side of the grainhead and the rear bogey;
   (b) memory for storing distance values from the proximity sensors for each type of grain off-load vehicle for use later use; and
   (c) readout from said sensors being fed to a video screen facing the combine operator; and
   the combine being steerable adjacent to a grain off-loading vehicle for the combine to unload grain stored in the rear grain bogey into the grain off-loading vehicle.

7. The improved articulated combine of claim 6, wherein the proximity sensors also are connected to a processor for recalling stored distance values in memory for different types of grain off-loading vehicles.

* * * * *